US005407963A

United States Patent [19]
Willson et al.

[11] Patent Number: 5,407,963
[45] Date of Patent: Apr. 18, 1995

[54] NON-CFC FOAM PRODUCED USING BLENDED SURFACTANTS

[76] Inventors: Jennifer Willson, 1520 Venetian Boulevard #202, Point Edward, Ontario, Canada, N7T 7Z8; Paul J. Meunier, Box 20 Beverly Glen, Camlachie, Ontario, Canada, N0N 1E0; Vyacheslav S. Grinshpun, 1277 Daley Avenue, Sarnia, Ontario, Canada, N7S 5X3

[21] Appl. No.: 257,407

[22] Filed: Jun. 9, 1994

[51] Int. Cl.$^6$ ................................................ C08J 9/14
[52] U.S. Cl. .................................... 521/131; 521/181
[58] Field of Search ............................ 521/131, 181

[56] References Cited

U.S. PATENT DOCUMENTS

| | | |
|---|---|---|
| 3,389,094 | 6/1968 | D'Alessandro . |
| 4,412,014 | 10/1983 | Frentzel et al. . |
| 4,423,163 | 12/1983 | Doerge . |
| 4,444,912 | 4/1984 | Carlson et al. . |
| 4,539,338 | 9/1985 | Carlson et al. ............ 521/181 |
| 4,546,119 | 10/1985 | Lunt et al. ................ 521/181 |
| 4,694,028 | 9/1987 | Saeki et al. . |
| 4,882,364 | 11/1989 | Kyle et al. ................ 521/181 |
| 4,883,824 | 11/1989 | Meunier et al. ........... 521/181 |
| 4,900,759 | 2/1990 | Clark et al. . |
| 4,956,394 | 9/1990 | Kifer et al. ............... 521/181 |

FOREIGN PATENT DOCUMENTS 2099888  1/1994  Canada .
WO91/10704  7/1991  WIPO .

*Primary Examiner*—Morton Foelak
*Attorney, Agent, or Firm*—C. Michael Gegenheimer

[57] ABSTRACT

This invention relates to the production of low density resol foams from resol resins. The phenolic foams have a density of 2.0 pounds per cubic foot or less and are produced with a blended surfactant.

11 Claims, No Drawings

NON-CFC FOAM PRODUCED USING BLENDED SURFACTANTS

TECHNICAL FIELD

This invention relates to the manufacture of phenolic resol foams from phenol formaldehyde resins and more specifically to the manufacture of closed cell resol foams using surfactant blends.

BACKGROUND ART

The foam industry has been using chlorofluorocarbons (CFC) and hydrogenated chlorofluorocarbons (HCFC) as blowing agents for producing foams from synthetic resins. The industry constantly is striving to produce foams which have better performance, The choice of surfactant is critical in achieving a uniform closed cell structure which in turn is important in defining the thermal and mechanical properties of the foam. In addition to affecting the foam, the choice of surfactant can also impact the overall processing of the foam. This invention discloses improved processing and production of closed cell non-CFC resol foams.

DISCLOSURE OF INVENTION

We now have discovered a process for producing a resol foam which provides a foam which has desirable product performance by using a blend of a high molecular weight ethylene oxide-propylene oxide block copolymer with an ethoxylated alkylphenol. Our process includes the steps of:

providing a foaming composition of:
(a) a phenol formaldehyde resol resin having substantially no free formaldehyde and having a water content of 4 to 8% and a viscosity ranging from 5,000 cps to 40,000 cps at 40° C.;
(b) a blowing agent;
(c) the blended surfactant; and
(d) catalyst;

mixing the composition to initiate foaming and to produce a resol foam; and curing the resol foam to a density ranging from 0.5 to 3.0 pounds per cubic foot. This process allows us to foam phenol formaldehyde resins which have a very high viscosity and cure the foams to a very low density.

DETAILED DESCRIPTION OF THE INVENTION

A blend of (i) ethylene oxide-propylene oxide block copolymers having a molecular weight greater than 9000 but preferably less than 15,000 and (ii) an ethoxylated alkylphenol represented by the formula:

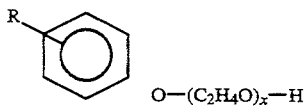

O—(C$_2$H$_4$O)$_x$—H wherein R is an alkyl group having 1 to 20 carbon atoms and x is an integer ranging from 4 to 120.

Preferably the copolymer has a molecular weight ranging from 10,000 to 13,000. Preferably the alkyl phenol is ethoxylated dodecylphenol wherein x ranges from 30 to 50.

The blended surfactant preferably has ratio by weight of copolymer to alkyl phenol ranging from 75:25 to 25:75. More preferably the blended surfactant is equal parts by weight copolymer and alkylphenol.

The blowing agent can be selected from a number of HCFCs or hydrofluorocarbons (HFCs). Preferably, the HCFCs or HFCs have a boiling point below 0° C. Specific examples of these low boiling point blowing agents include 1-chloro-1,1-difluoroethane (142b), dichlorofluoro-methane (22), 2-chloro-1,1,1,2-tetrafluoroethane (124), 1,1-difluoroethane (152a), pentafluoroethane (125) and 1,1,1,2-tetrafluoroethane.

The blowing agent also may include a perfluoroalkane wherein the perfluoroalkane comprises 1 to 5 weight percent of the total blowing agent weight. Preferably, the perfluoroalkane is represented by the formula:

$C_nH_xF_y$ wherein n is an integer ranging from 4 to 20, x is zero or an integer ranging from 2 to 10, and $x+y=2n+2$. Specific examples of the perfluoroalkane include dodecafluoropentane, tetradecafluorohexane, hexadecafluoroheptane.

Preferably the perfluoroalkane comprises 1 to 3 weight percent and more preferably, 1 to 2 weight percent of total blowing agent weight.

The cured resol foam has a density ranging from 0.5 to 3.0 pounds per cubic foot. Preferably the resol foam density ranges from 0.7 to 1.8 pounds per cubic foot. The resol resin preferably has a viscosity ranging from 5,000 cps to 40,000 cps at 40° C. Preferably the resol resin has a viscosity ranging from 8,000 cps to 20,000 cps at 40° C.

The basic steps for preparing foams from resol resin are as follows:
(a) preparation of the resol resin;
(b) addition of any modifying agent;
(c) neutralizing the resin;
(d) stripping off water, e.g. by vacuum stripper;
(e) adding the surfactant;
(f) adding a blowing agent;
(g) adding an acid catalyst and allowing the mixture to foam; and
(h) curing the foam.

The foams are prepared from resols which have been made using conventional starting mole ratios of phenol to formaldehyde, in the present case in the range of 1:1 to 1:4.5, preferably 1:1.5 to 1:2.5. The high mole ratio materials are the basis for resins which are substantially free of phenol and which can be treated with a formaldehyde co-reactant or scavenger, to reduce the initially high free formaldehyde content.

The resin is concentrated to reduce the free water content of the resin. A typical viscosity resin used for manufacturing resol foam has a viscosity in the order of 5,000 to 40,000 cps and a free water content of 4 to 8%. However, during the manufacture of phenolic foams from high viscosity resins in accordance with the present invention, the resin utilized will preferably have a viscosity in the order of 8,000 to 20,000 cps at 40° C.

We also use a ramping postcure procedure according to the following:
0 to 70 minutes at 75°–85° C. followed by
20 to 105 minutes at 90°–95° C. followed by
60 to 170 minutes at 100°–105° C.

The purpose of the ramped postcure cycle is to reduce the cell wall damage that might otherwise occur to the foam if it was postcured under higher initial temperatures, while reducing the postcure time by gradually increasing the curing temperature, and therefore rate of cure, instead of maintaining the temperature at the relatively low initial. The low initial postcure temperature and the ramping cycle ensure that the green foam is not exposed to high temperatures when the foam cell walls are still weak and undercured. The ramping temperature cycle allows the foam cell walls to cure and strengthen at a more controlled rate, with a gradual elimination of the water vapour produced during the curing reaction. The result is a foam that can withstand the increased internal cell pressure and resist cell rupture at higher temperatures. A ramped postcure cycle reduces cell wall damage that would occur under more severe postcure conditions and improves the thermal performance of the foam.

The choice of surfactant is critical in achieving a uniform closed cell structure which in turn is important in defining the thermal and mechanical properties of the foam. In addition to affecting the foam, the choice of surfactant can also impact the overall processing of the foam. This invention provides improved processing and producing of closed cell non-CFC resol foams using a blend of a high molecular weight ethylene oxide-propylene oxide block copolymer with an ethoxylated alkylphenol.

EXAMPLE 1

Preparation of Resol

The resol resin used in the production of these foams used a formaldehyde:phenol (F/P) mole ratio of 2.3:1, using 52% formaldehyde and 99% phenol. The reaction was carried out under basic conditions at elevated temperatures with 50% caustic solution. When the Ostwald viscosity of the resin reached 62cst (measured at 25° C.), the reaction was cooled and neutralized with 50% aqueous aromatic sulphonic acid. Urea was added as a formaldehyde scavenger at a level of 77% by mole of the residual formaldehyde. The resin was passed through a thin film evaporator to reduce the water content from about 30% to 4–8%. An ethylene oxide based nonionic surfactant Pluronic F127 from BASF was then added in the molten state at 3.5% by weight of the resin and mixed into the resin to form a homogeneous mixture. The final viscosity of the resin was 9000–12000 cps (measured at 40° C.),

EXAMPLE 2

Preparation of a non-CFC Resol Foam

The resol foam was prepared by mixing together the resol resin and surfactant with the blowing agent and acid catalyst using a high shear short residence, rotor/stator continuous mixer. The blowing agent was saturated with nitrogen at 200 psi prior to introduction in the high shear mixer. The foaming catalyst was a blend of resorcinol, diethylene glycol, and a mixture of xylene and toluene sulphonic acids. (See U.S. Pat. Nos. 4,883,824 and 4,945,077). The resol resin, blowing agent, and catalyst were continuously metered to the mixer by means of suitable flow metering devices in the following ratios:

| | |
|---|---|
| resin/surfactant | 100 |
| HCFC142b | 8.63 |
| catalyst | 11.8 |

It is important that the pressure inside the mixer be controlled to a range that prevents premature foaming, typically 170 to 250 psig. This pressure range depends on the vapor pressure and boiling point of the blowing agent and on the temperature in the mixer. A blowing agent such as HCFC141b, which has a boiling point of 32° C. does not require the high operating pressures to prevent premature foaming because the vapor pressure is 35 psia (at 60° C.). However, very low boiling blowing agents like HCFC142b and particularly HCFC22 which boil at −9.8° C. and −40.8° C. respectively, require much higher mixer pressures to prevent premature foaming.

The foamable mixture (resin/surfactant, blowing agent, catalyst) exited the mixer through evenly spaced tubes and nozzles to form continuous beads of froth on a moving facer. This resulted in parallel lines of foam which knitted together, as the froth expanded, to form a continuous sheet. The foam sheet then moved through a conveyor oven at approximately 80° C. at a fixed rate to produce a board that was cured enough to handle. The boards underwent further curing using the following postcure cycle:

25 minutes at 75° C. followed by
25 minutes at 85° C. followed by
50 minutes at 90° C. followed by
25 minutes at 95° C. followed by
25 minutes at 100° C. followed by
50 minutes at 105° C.

Test results on the final product are shown in Table 2.

EXAMPLES 3–4

The preparation of non-CFC resol foams in Examples 3 and 4 follow the procedure in Example 2 using resol resin from Example 1 with the exception of a change in surfactant. Formulations are shown in Table 1. In Example 3, the surfactant was a 40 mole ethoxylate of dodecylphenol, Harfoam PI. In Example 4, the surfactant was a 1/1 wt/wt blend of Harfoam PI and Pluronic F127. The surfactants were preblended in the specified ratio and then mixed, in a molten state, with the resol resin.

EXAMPLES 5–8

The general resol resin preparation followed Example 2. The surfactant used and foam formulations are shown in Table 1. In Examples 5–8, a blowing agent additive, perfluoroalkane (PFA) was used to reduce the foam cell size and improve thermal and mechanical properties of the foam. The specific PFA used in these examples was dodecafluoropentane ($C_5F_{12}$) sold by 3M as PF-5050 Performance Fluid. A preweighed quantity of PFA was blown, with nitrogen, into the bottom of an enclosed pressure vessel containing HCFC142b, to give a 98/2 wt/wt ratio of HCFC142b/PFA. This blowing agent/PFA blend was then saturated with nitrogen to 200 psi. Product properties for Examples 5–8 are shown in Table 2.

RESULTS

As mentioned earlier, premature frothing of the blowing agent can be controlled by mixer head pressure. When premature frothing occurs, the foam froth can be described as having a "dry" or fluffy appearance. When premature frothing does occur, an excessive amount of blowing agent is required to produce a foam board, to compensate for blowing agent losses during foaming. This method of compensation can be very costly. Another negative effect of a "dry" froth is a poor ability of the foam beads to knit together to form a continuous board.

A "wet" laydown is caused by very high mixer pressure and can have a detrimental effect on the early stages of nucleation and cell formation. Although the knitting ability of the froth improves in a "wet" laydown, the processing of the uncured foam is more difficult, because "wet" foam has a greater tendency to adhere to hardware at various points throughout the process (for example, side guides), requiring costly production downtime for cleaning.

F127 is a gelling surfactant and it is believed that this surfactant gels in the presence of the water in the resin (up to 8%) and other water generated during the curing and crosslinking reactions. The gelation causes the viscosity of the foaming material to rise dramatically after mixing, reducing or preventing the drainage of polymer from the cell windows. Results with F127 surfactant and HCFC142b blowing agent are shown in Table 2.

In our investigations of other surfactants to assist in the elimination of CFCs from the foam, ethoxylated alkylphenols were considered as candidates because of the chemical similarity between the phenolic resin and the phenol component in the alkylphenol ethoxylate. A 40 mole ethoxylate of dodecylphenol, Harfoam PI, produced encouraging results in terms of foam properties (Example 3) but gave a "wetter" froth than with F127. In an attempt to reduce the "wetness" of the froth, a 1/1 blend of F127 and Harfoam PI was tried (Example 4) and resulted in a foam that was less prone to sticking to the foam oven, using less blowing agent. This foam was made with up to 10% less blowing agent than either F127 or Harfoam PI foams and had better thermal and mechanical properties. To quantify the effect of formulation changes on foam brittleness, friability is measured according to the ASTM method C421 and is reported as weight loss as a percent of the whole. The objective is to produce a foam with a low friability. Table 2 shows that surfactant blend improved the friability (compare Examples 2 and 4) even at the slightly lower density of 2.5 pcf compared to 2.9 pcf.

Examples 5–7 demonstrate a similar surfactant effect but at a significantly lower foam density. A reduction in blowing agent of approximately 15% was observed for both the Harfoam PI and surfactant blend with good thermal properties and friability.

Example 8 demonstrates the ability of this technology to produce a low density foam at 0.92 pcf with good initial thermal properties.

A blend of surfactants can be used to improve the manufacturing of non-CFC resol foams. By blending two nonionic surfactants, a high molecular weight ethylene oxide-propylene oxide block copolymer and a lower molecular weight ethoxylated dodecylphenol, foam properties were maintained and an improvement in the production of the foam was observed. Because the surfactant blend modified the froth properties, less blowing agent was required, making the process more economical, and sticking of uncured or partially cured foam to hardware in the oven was substantially reduced or eliminated.

TABLE 1

RESOL FOAM FORMULATIONS

| Examples | Surfactant [1] | HCFC142b (PPH Resin) [2] | Catalyst (PPH Resin) |
|---|---|---|---|
| 2 | Pluronic F127 | 8.63 | 11.68 |
| 3 | Harfoam Pl | 8.75 | 12.45 |
| 4 | 1/1 Harfoam Pl/ Pluronic F127 | 7.95 | 12.25 |
| 5 | Pluronic F127 | [2] 17.80 | 21.20 |
| 6 | Harfoam Pl | [2] 15.40 | 21.60 |
| 7 | 1/1 Harfoam Pl/ Pluronic F127 | [2] 15.42 | 17.95 |
| 8 | 1/1 Harfoam Pl/ Pluronic F127 | [2] 21.30 | 19.15 |

NOTE:
[1] added at 3.5% by weight of resol resin
[2] blowing agent quantity, measured as parts per hundred parts resin/surfactant, includes PFA.

TABLE 2

FOAM PROPERTIES

| Examples | Density (pcf) | Thermal Conductivity (BTU.In/ft².hr.F) | Closed Cell Content [1] (%) | Compressive Strength [2] (kPa) | Friability [3] (% wt. Loss) |
|---|---|---|---|---|---|
| 2 | 2.9 | 0.130 | 89.6 | 143 | 45 |
| 3 | 2.2 | 0.136 | — | 231 | — |
| 4 | 2.5 | 0.121 | 86.5 | 296 | 30 |
| 5 | 1.6 | 0.116 | 89.1 | — | 30 |
| 6 | 1.5 | 0.118 | 93.3 | — | 35 |
| 7 | 1.7 | 0.121 | 97.0 | 177 | 30 |
| 8 | 0.9 | 0.138 | — | — | 64 |

NOTES:
[1] measured with air compression pycnometer according to ASTM D2858 procedure C
[2] at 10% deformation
[3] tested according to ASTM C421

We claim:

1. A process for producing a closed cell resol foam comprising the steps of:
   providing a foaming composition of
   (a) a phenol formaldehyde resol resin having substantially no free formaldehyde and having a water content of 4 to 8% and a viscosity ranging from 5,000 cps to 40,000 cps at 40° C.;
   (b) a surfactant comprising a blend of (i) ethylene oxide-propylene oxide block copolymers having a molecular weight greater than 9000 but preferably less than 15,000 and (ii) an ethoxylated alkylphenol represented by the formula:

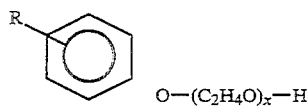

wherein R is an alkyl group having 1 to 20 carbon atoms and x is an integer ranging from 4 to 120;
   (c) a blowing agent; and
   (d) catalyst
   mixing the composition to initiate foaming and to produce a resol foam; and
   curing the resol foam to a density ranging from 0.5 to 3.0 pounds per cubic foot.

2. A process according to claim 1, wherein the blend of copolymer to alkylphenol ranged from 75:25 to 25:75 by weight.

3. A process according to claim 1, wherein the blend of surfactants comprises equal parts by weight of the copolymer and the alkylphenol.

4. A process according to claim 1, wherein the copolymer has a molecular weight of 10,000–13,000 and the alkyl phenol is ethoxylated dodecylphenol where x ranges from 30–50.

5. A process according to claim 1, wherein the blowing agent consists essentially of (i) a low boiling point hydrogenated chlorofluorocarbon (HCFC) or hydrogenated fluorocarbon (HFC) and (ii) a perfluoroalkane wherein the perfluoroalkane comprises 1 to 5 weight percent of total blowing agent weight.

6. A process according to claim 5, wherein the perfluoroalkane comprises 1 to 2 weight percent of total blowing agent weight.

7. A process according to claim 1, wherein phenolic foam density ranges from 0.7 to 1.8 pounds per cubic foot.

8. A process according to claim 5, wherein the perfluoroalkane is represented by the formula:

$$C_nH_xF_y$$

wherein n is an integer ranging from 4 to 20, x is zero or an integer ranging from 2 to 10, and x and $y=2n+2$.

9. A process according to claim 1, wherein the blowing agent is a mixture of 1-chloro-1,1-difluoroethane and dodecafluoropentane.

10. A process according to claim 1, wherein the resol resin has a viscosity ranging from 8,000 cps to 20,000 cps at 40° C.

11. A process according to claim 5, wherein the HCFC or HFC has a boiling point below 0° C.

* * * * *